(12) United States Patent
Arata

(10) Patent No.: US 7,828,243 B2
(45) Date of Patent: Nov. 9, 2010

(54) SCRAMJET ARRANGEMENT FOR HYPERSONIC AIRCRAFT

(75) Inventor: Allen A. Arata, Los Angeles, CA (US)

(73) Assignee: Northrop Grumman Systems Corporation, Los Angeles, CA (US)

( * ) Notice: Subject to any disclaimer, the term of this patent is extended or adjusted under 35 U.S.C. 154(b) by 322 days.

(21) Appl. No.: 11/196,187

(22) Filed: Aug. 3, 2005

(65) Prior Publication Data

US 2007/0028594 A1 Feb. 8, 2007

(51) Int. Cl.
- F02K 7/10 (2006.01)
- F02K 7/16 (2006.01)
- B64D 27/16 (2006.01)

(52) U.S. Cl. .................. 244/45 R; 244/55; 244/74; 60/225; 60/768

(58) Field of Classification Search .......... 60/224, 60/225, 767–769; 244/45 R, 55, 58, 73 R, 244/74

See application file for complete search history.

(56) References Cited

U.S. PATENT DOCUMENTS

| | | | |
|---|---|---|---|
| 2,973,165 A * | 2/1961 | Davidson | 244/54 |
| 2,982,496 A * | 5/1961 | Creasey et al. | 244/15 |
| 3,146,971 A * | 9/1964 | Walker et al. | 244/15 |
| 3,212,734 A * | 10/1965 | Keenan | 244/74 |
| 3,340,689 A * | 9/1967 | Kueng | 60/226.1 |
| 3,430,640 A | 3/1969 | Lennard | |
| 4,025,008 A | 5/1977 | Peikert | |
| 4,221,230 A | 9/1980 | Nicoloff et al. | |
| 4,307,743 A | 12/1981 | Dunn | |
| 4,620,679 A | 11/1986 | Karanian | |
| 4,655,413 A | 4/1987 | Genssler et al. | |
| 4,802,639 A * | 2/1989 | Hardy et al. | 244/2 |
| 4,919,364 A * | 4/1990 | John et al. | 60/768 |
| 4,934,632 A * | 6/1990 | Kim | 60/768 |
| 4,991,795 A | 2/1991 | Koncsek | |
| 5,078,341 A | 1/1992 | Bichler et al. | |
| 5,116,251 A | 5/1992 | Bichler et al. | |
| 5,337,975 A | 8/1994 | Peinemann | |
| 5,518,204 A * | 5/1996 | Tracy | 244/45 R |
| 6,729,577 B2 * | 5/2004 | Morgenstern | 244/45 R |
| 7,150,432 B2 * | 12/2006 | Ouellette et al. | 244/53 B |
| 2002/0190158 A1 | 12/2002 | Franchet et al. | |
| 2004/0050061 A1 * | 3/2004 | Schmotolocha et al. | 60/761 |

* cited by examiner

*Primary Examiner*—Ted Kim
(74) *Attorney, Agent, or Firm*—Alan G. Towner, Esq.; Pietragallo Gordon Alfano Bosick & Raspanti, LLP

(57) ABSTRACT

Hypersonic aircraft having a lateral arrangement of turbojet and SCRAMjet engines are disclosed. The SCRAMjet engines may be positioned laterally outboard of the turbojet engines. In one embodiment, the turbojet inlet and outlet openings may be covered during use of the SCRAMjets in order to provide compression and expansion ramps for the laterally adjacent SCRAMjet engines. The side-by-side arrangement of the turbojet and SCRAMjet engines reduces the vertical thickness of the aircraft, thereby reducing drag and potentially increasing performance.

8 Claims, 3 Drawing Sheets

SCRAMJET ARRANGEMENT FOR HYPERSONIC AIRCRAFT

FIELD OF THE INVENTION

The present invention relates to hypersonic aircraft, and more particularly relates to a lateral arrangement of turbojet and SCRAMjet engines for such aircraft.

BACKGROUND INFORMATION

Hypersonic aircraft may utilize a combination of turbojet engines and RAMjet or SCRAMjet engines. The turbojet engines are used at relatively low speeds and the RAMjet or SCRAMjet engines are used at relatively high speeds. For example, conventional hypersonic aircraft may use turbojets for flight up to approximately Mach 3 and RAMjets or SCRAMjets for flight at higher speeds.

In RAMjet engines, thrust is produced by passing hot exhaust from the combustion of a fuel through a nozzle. The nozzle accelerates the flow, and the reaction to this acceleration produces thrust. In a RAMjet, high pressure is produced by "ramming" external air into the combustor using the forward speed of the vehicle. SCRAMjet is an acronym for Supersonic Combustion RAMjet. SCRAMjets differ from RAMjets in that combustion takes place at supersonic air velocities through the engine. Since there are no compressors in RAMjets or SCRAMjets, they tend to be lighter and simpler than turbojets, which require a compressor to generate high pressure in the combustor. Since RAMjets and SCRAMjets cannot produce static thrust, other propulsion systems such as turbojet engines must be used to accelerate the vehicle to a speed where the RAMjets or SCRAMjets begin to produce thrust.

RAMjets and SCRAMjets typically include compression ramps at their inlets and expansion ramps at their outlets in order to provide the desired gas pressures entering and leaving the engines. Some hypersonic aircraft engines are equipped with movable inlet ramps. Examples of such movable ramps and their control mechanisms are disclosed in U.S. Pat. Nos. 3,430,640, 4,025,008, 4,307,743, 4,620,679 and 4,991,795, which are incorporated herein by reference.

SUMMARY OF THE INVENTION

The present invention provides a side-by-side or lateral arrangement of turbojet and SCRAMjet engines for hypersonic aircraft. As used in the following description and claims, the term "SCRAMjet" includes both SCRAMjet and RAMjet engines. Instead of positioning the SCRAMjet engine(s) vertically below the turbojet engine(s), the present design positions the SCRAMjet and turbojet engines laterally or spanwise beside each other. This arrangement provides improved hypersonic aircraft design and may result in improved performance. In one embodiment, inlet and outlet openings of the turbojets may be covered during SCRAMjet use in order to provide compression and expansion ramps for the SCRAMjet engines.

An aspect of the present invention is to provide a hypersonic aircraft comprising at least one turbojet engine mounted on the aircraft, and at least one SCRAMjet engine mounted laterally adjacent to the at least one turbojet engine.

Another aspect of the present invention is to provide a turbojet and SCRAMjet assembly for a hypersonic aircraft comprising a turbojet engine, and a SCRAMjet engine disposed laterally adjacent to the turbojet engine.

These and other aspects of the present invention will be more apparent from the following description.

BRIEF DESCRIPTION OF THE DRAWINGS

In FIG. 7, the inlet and outlet of the turbojet engine are uncovered when the turbojet engine is in use. In FIG. 8, the inlet and outlet of the turbojet engine are covered when the turbojet is not in use in order to provide compression and expansion ramps for the adjacent SCRAMjet engine.

DETAILED DESCRIPTION

Figure 1:
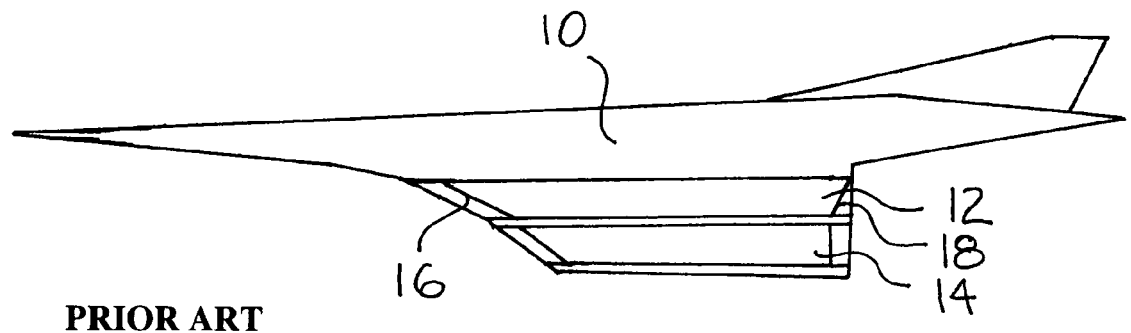
FIG. 1 is a partially schematic side view of a hypersonic aircraft including a conventional turbojet and SCRAMjet arrangement in which the SCRAMjet is positioned vertically below the turbojet.
Figure 2:
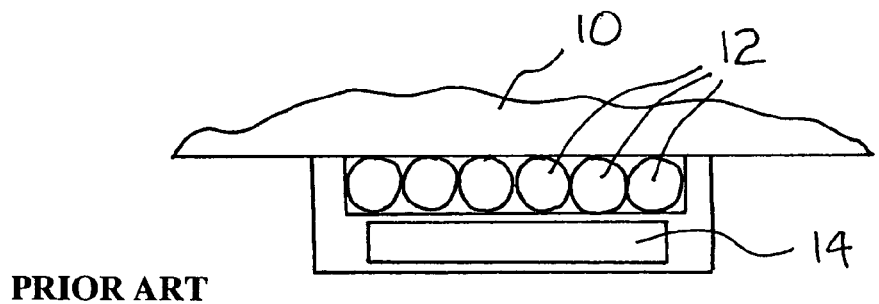
FIG. 2 is a front view showing a portion of the hypersonic aircraft of FIG. 1 and the vertical turbojet and SCRAMjet arrangement.
Figure 3:
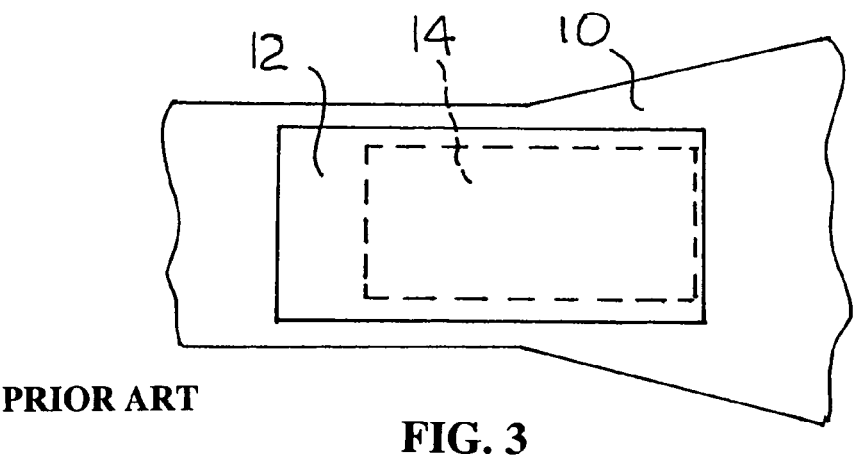
FIG. 3 is a top view showing a portion of the hypersonic aircraft of FIG. 1 with the SCRAMjet positioned below the turbojet.

FIGS. 1-3 schematically illustrate a hypersonic aircraft 10 having a conventional engine arrangement in which a turbojet engine 12 is mounted on the underside of the aircraft 10 and a SCRAMjet engine 14 is mounted vertically below the turbojet engine 12. As shown in FIG. 1, the turbojet engine 12 has an inlet 16 which may be covered to provide a compression ramp above the inlet of the SCRAMjet 14, which is located vertically below the turbojet 12. The turbojet 12 also has an outlet 18 which may be covered to provide an expansion ramp above the outlet of the SCRAMjet 14.

The conventional turbojet 12 and SCRAMjet 14 arrangement shown in FIGS. 1-3 produces a thick airplane as shown in the side and front views. The thick body provides compression and expansion ramps that are necessary for the SCRAMjet to work. However, the thick body increases transonic forebody and base drag such that the turbojet engine(s) need a lot of thrust and fuel to get to Mach 3. This makes the aircraft heavy and may result in an impractical design.

Figure 4:
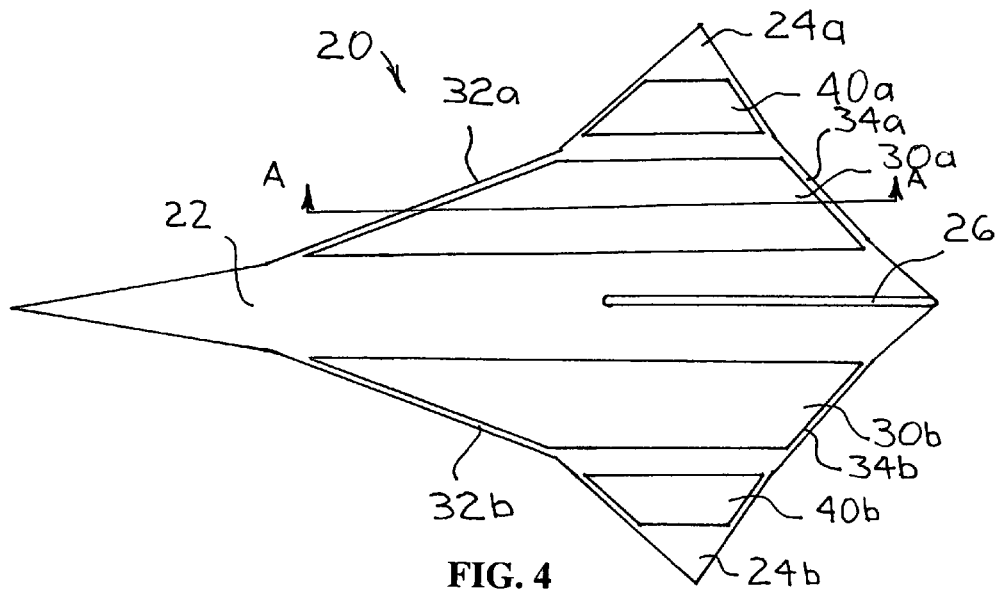
FIG. 4 is a partially schematic top view of a hypersonic aircraft having a lateral or spanwise turbojet and SCRAMjet engine arrangement in accordance with an embodiment of the present invention.
Figure 5:
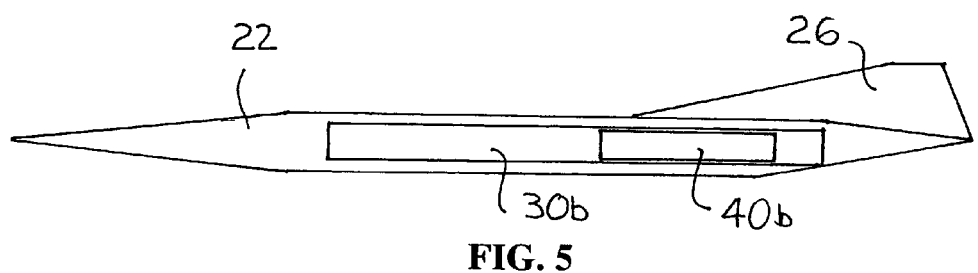
FIG. 5 is a partially schematic side view of the hypersonic aircraft of FIG. 4 illustrating the laterally arranged turbojet and SCRAMjet engines.
Figure 6:
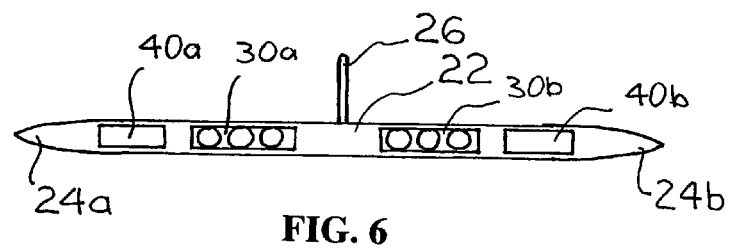
FIG. 6 is a partially schematic front view of the hypersonic aircraft of FIG. 4 further illustrating the lateral arrangement of the turbojet and SCRAMjet engines.

FIGS. 4-6 schematically illustrate a hypersonic aircraft 20 in accordance with an embodiment of the present invention. The hypersonic aircraft 20 includes a body or fuselage 22, wings 24a and 24b, and a tail 26. Turbojet engines 30a and 30b are provided within or laterally adjacent to the body 22 of the hypersonic aircraft 20. SCRAMjet engines 40a and 40b are provided in a spanwise arrangement laterally outboard of the turbojet engines 30a and 30b. As shown in FIGS. 4-6, the SCRAMjets 40a and 40b are provided in substantially the same horizontal plane as the turbojets 30a and 30b. While this may be a preferred arrangement for many hypersonic aircraft designs, it may be desirable in some aircraft to provide the outboard SCRAMjet engines 40a and 40b in a horizontal plane slightly above or below the horizontal plane of the turbojets 30a and 30b. Furthermore, although the SCRAMjets 40a and 40b as shown in FIGS. 4 and 6 are spaced a lateral distance away from their corresponding turbojets 30a and 30b, it may be desirable in some aircraft designs to move the SCRAMjets laterally inward and/or move the turbojets laterally outward in accordance with the present invention.

As shown in FIG. 4, the turbojets 30a and 30b have inlets which may be at least partially covered to serve as compression ramps 32a and 32b for the adjacent SCRAMjets 40a and 40b. The turbojets 30a and 30b also include outlets which may be at least partially covered to provide expansion ramps 34a and 34b for the adjacent SCRAMjets 40a and 40b. Thus, by selectively covering the turbojet inlets and outlets, compression and expansion ramps in the form of planform edges are provided for the laterally adjacent SCRAMjets.

Figure 7:
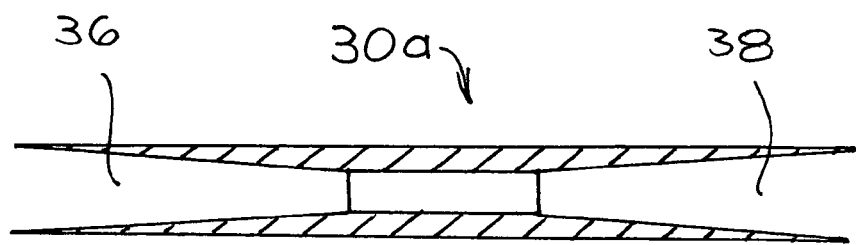
FIGS. 7 and 8 are sectional views of a turbojet engine taken through section A-A of FIG. 4.
Figure 8:
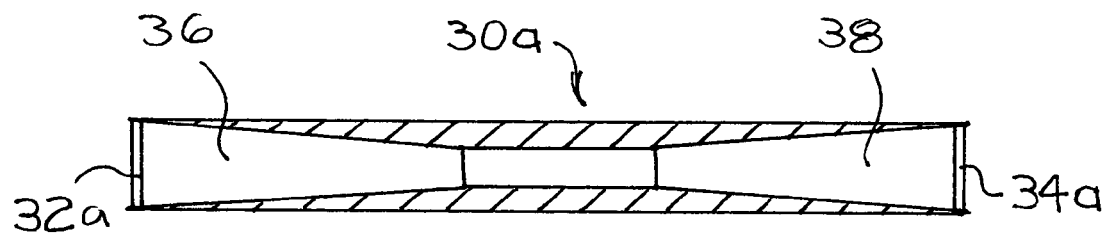

FIGS. 7 and 8 are sectional views of the turbojet engine 30a taken through section A-A of FIG. 4. The turbojet 30a includes an inlet region 36 having two sharp leading edges and an outlet region 38. In FIG. 7, the inlet 36 and outlet 38 are uncovered, e.g., when the turbojet 30a is being used at subsonic or relatively low hypersonic speeds. In FIG. 8, an inlet cover or panel 32a is provided over the inlet 36, and an outlet cover or panel 34a is provided over the outlet 38. The inlet cover 32a acts as a compression ramp which is positioned laterally adjacent to the inlet of the SCRAMjet 40a. The outlet cover 34a acts as an expansion ramp which is positioned laterally adjacent to the outlet of the SCRAMjet 40a. The inlet compression ramp cover 32a and outlet expansion ramp cover 34a may be moved to their deployed and stowed positions by any suitable mechanism, such as the mechanisms disclosed in U.S. Pat. Nos. 3,430,640, 4,025,008, 4,307,743, 4,620,679 and 4,991,795, which are incorporated herein by reference.

Thus, in the SCRAMjet mode, the leading 32a and trailing 34a panels deploy from the turbojet inlet and exhaust to close of the turbojet inlet and exhaust. The panels 32a and 34a create wide flat edges to compress and expand the flow for the SCRAMjet. The planform edges are thus used instead of the thick lower body on conventional aircraft configurations. Although the leading 32a and trailing 34a panels shown in FIG. 8 are flat, alternate embodiments may have leading and trailing panels that have bends or curves in them to provide the desired performance. The SCRAMjet inlets and exhausts may also have similar deployable panels (not shown) if desired.

In accordance with the present invention, by providing the turbojet engines beside the SCRAMjet engines, a thinner airplane is possible in comparison with the conventional vertical arrangement shown in FIGS. 1-3. The present design decreases transonic forebody and base drag such that the turbojet engines need less thrust and fuel, e.g., to get to Mach 3. This makes the aircraft lighter and provides a more practical design. The body thickness no longer provides the compression and expansion ramps that are necessary for the SCRAMjet to work. Instead, the planform edges of the turbojet inlet and outlet covers and provide the compression and expansion ramps for the SCRAMjets.

Whereas particular embodiments of this invention have been described above for purposes of illustration, it will be evident to those skilled in the art that numerous variations of the details of the present invention may be made without departing from the invention as defined in the appended claims.

The invention claimed is:

1. A hypersonic aircraft comprising:
   two turbojet engines mounted on wings of the aircraft, wherein each turbojet engine has an inlet; and
   two SCRAMjet engines mounted on the wings of the aircraft laterally adjacent to, and at different lateral positions from, the two turbojet engines, wherein the SCRAMjet engines are only laterally positioned entirely outboard from the adjacent turbojet engines, and the aircraft does not include a SCRAMjet engine located vertically above, below or laterally inboard the turbojet engines, wherein each of the turbojet engines comprises an inlet cover positionable laterally adjacent to the inlet of an adjacent one of the SCRAMjets and the turbojet inlet covers provide compression ramps for the SCRAMjets, wherein each wing comprises a raked leading edge having a greater rake angle for a portion of the wing adjacent to the turbojet engine than a rake angle of a portion of the wing adjacent to the SCRAMjet engine, and wherein each of the compression ramps forms a portion of the leading edge of the wing when the compression ramp covers the inlet of the turbojet engine.

2. The hypersonic aircraft of claim 1, wherein the two turbojet engines and the two SCRAMjet engines are located in substantially the same horizontal plane.

3. The hypersonic aircraft of claim 1, comprising an expansion ramp for each of the SCRAMjet engines located laterally adjacent to an outlet of each of the SCRAMjet engines.

4. The hypersonic aircraft of claim 3, wherein the expansion ramps are located in substantially the same horizontal plane as the outlets of the SCRAMjet engines.

5. The hypersonic aircraft of claim 4, wherein at least a portion of each of the expansion ramps comprises an outlet cover of an adjacent one of the turbojet engines.

6. The hypersonic aircraft of claim 1, wherein each of the turbojet engines comprises an outlet cover positionable laterally adjacent to an outlet of an adjacent one of the SCRAMjets, and the turbojet outlet covers provide expansion ramps for the SCRAMjets.

7. The hypersonic aircraft of claim 6, wherein the turbojet inlet and outlet covers are substantially flat.

8. A hypersonic aircraft comprising:
   at least one turbojet engine mounted on a wing of the aircraft having an inlet and an outlet; and
   at least one SCRAMjet engine mounted laterally adjacent to the at least one turbojet engine, wherein the at least one SCRAMjet engine has an inlet is only laterally positioned entirely outboard from the inlet of the at least one turbojet engine, wherein the at least one turbojet engine comprises an inlet cover movable to a position covering the inlet of the at least one turbojet engine and forming a lateral compression ramp for the at least one SCRAMjet, and wherein the aircraft does not include a SCRAMjet engine located vertically above or below the at least one turbojet engine, wherein each of the turbojet engines comprises an inlet cover positionable laterally adjacent to the inlet of an adjacent one of the SCRAMjets and the turbojet inlet covers provide compression ramps for the SCRAMjets, wherein each wing comprises a raked leading edge having a greater rake angle for a portion of the wing adjacent to the turbojet engine than a rake angle of a portion of the wing adjacent to the SCRAMjet engine, and wherein each of the compression ramps forms a portion of the leading edge of the wing when the compression ramp covers the inlet of the turbojet engine.

* * * * *